United States Patent [19]
Burk

[11] 3,811,558
[45] May 21, 1974

[54] CONDITIONED FOOD TRANSPORT CONTAINER

[76] Inventor: Robert L. Burk, 417 S. Lucerne Blvd., Los Angeles, Calif. 90020

[22] Filed: July 21, 1972

[21] Appl. No.: 273,970

[52] U.S. Cl. .................................................. 206/4
[51] Int. Cl. ............................................ A45c 11/20
[58] Field of Search ......................... 206/4; 220/9 F

[56] References Cited
UNITED STATES PATENTS

| | | | |
|---|---|---|---|
| 3,730,374 | 5/1973 | Picciano et al. | 220/9 F |
| 3,696,987 | 10/1972 | Schuff et al. | 229/1.5 B |
| 3,472,568 | 10/1969 | Southwick | 220/9 F |
| 2,555,788 | 6/1951 | Donaldson | 206/4 |
| 2,723,072 | 11/1955 | Sayford, Jr. | 229/1.5 B X |
| 2,731,996 | 1/1956 | Hayes | 206/4 X |

Primary Examiner—Leonard Summer
Attorney, Agent, or Firm—William H. Maxwell

[57] ABSTRACT

A container for the transport of a serving of food at the temperature condition required therefor, together with supplements to be added thereto according to taste, and compartmented so as to accommodate utensils appropriate to be used in consuming the contained food. Sanitation and cleanliness is of prime concern, the container being characterized by replaceably expendible components, each serving its particular function and cooperatively related so as to maintain the food in its optimum prepared condition for appetizing exposure to the consumer.

3 Claims, 3 Drawing Figures

PATENTED MAY 21 1974  3,811,558

CONDITIONED FOOD TRANSPORT CONTAINER

Foods are not only consumed by the ultimate customer market, but they must be sold to distributors, wholesalers and retailers, and it is the commercial presentation of foods to buyers and the like with which this invention is primarily concerned. However, in the broad sense, the food container hereinafter disclosed is equally applicable to food transport situations such as are involved in catering or in traveling and/or picnicking. Thus, the size and shape of the container can vary, although the container as it is herein disclosed is intended to be used by salesmen in the promotion of sales to buyers who are interested in true samples of the food contemplated for purchase and/or for their distribution. Therefore, the container shown and later described is a sample food container and with the objective to transport conditioned food for presentation in its most presentable state of preparation, chilled or heated or whatever as circumstances require. To these ends, therefore, it is an object of this invention to provide a serving together with supplemental seasonings and the like contained within a protective enclosure with insulation therearound and with utensils provided, and all of which is conducted in a most sanitary way and with utmost cleanliness. That is, the food serving is most appetizing and presented in its optimum condition and all of which is assured by the container that I provide.

The transport and subsequent consumption of foods can be a messy situation due to fluidity and the liquids which are often involved. Sealed containment is complicated by the involvement of heat which can cause the development of internal pressures and the escape of vapors; or reversely the loss of heat can cause the development of internal vacuum and drawing in of atmosphere. Therefore, the prior art Thermos containers are characteristically rigid vessels adapted to withstand substantial internal as well as external pressures, as said pressures are developed due to temperature changes. A further problem is the environmental pressure changes due to altitude variations and all of which must be accounted for when containing fluids. It is an object of this invention to provide a light weight structurally non-rigid heat insulating container for fluids, with provision for the exhaust of or intake of vapors, and all without explosion or collapse thereof. With the present invention a heat insulating liner is employed over a primary closed vessel which is vented for pressure relief.

The transport and subsequent eating of food from one and the same container of the type thus far referred to is usually impractical, since a Thermos is ordinarily cumbersome. It is therefore an object of this invention to provide a serving cup which is the primary vessel for food containment and which is closed by a removeable lid, and all of which is replaceably insertable into the aforementioned liner. The lid of the cap is vented and permits atmospheric changes to occur, the serving cup being otherwise closed for food containment.

The transport of foods in the container thus far referred to is likely to be without spillage, but in the event of turning the container on its side, or upside down, there can be a discharge of some food liquids from the vent in the serving cup lid, and in which case the container comprised of the serving cup and liner is confined within a housing which closes onto the liner so as to prevent its separation and likewise to prevent the separation of the lid from the serving cup. In practice, the closure of the housing presses tight into working position and hermetically closes the container so that vapors or liquids cannot escape. It is an object therefore to contain unexpected discharge from the serving cup, and in the event of spillage it is an object to provide economic expendibility, each and every component being reuseable but so inexpensive as to be expendible; and all to the end that cleanliness is assured by replacement components as and when required.

With the container as thus far referred to, a compartment is formed for the accommodation of and to receive additives and/or supplements and as well to receive and store utensils which must be clean and available for the particular food to be eaten. It is an object therefore, to provide primary and secondary compartments by the use of said insulating liner, and to the end that the food container with its serving cup is virtually complete in every respect for the sampling of or eating of the food prepared and maintained in condition thereby.

SUMMARY OF INVENTION

This invention relates to the containment of conditioned foods, heated or cold or at room temperature as required. The primary object is to provide for a serving of food offered in a normally acceptable cup of moderate size, and in the case of a sample rather small, although size and/or shape is no limitation. Firstly therefore, the combination involves a serving cup A with a lid B and into which a food serving or sample is deposited in its optimum heat condition. A sectional insulating liner C positionably encloses the serving cup A with manually engageable means forming a utensil and food supplement chamber within a form fitted housing D having a cover E hermetically disengageable therewith to establish an enclosure.

DRAWINGS

The various objects and features of this invention will be fully understood from the following detailed description of the typical preferred form and application thereof, throughout which description reference is made to the accompanying drawings, in which.

PREFERRED EMBODIMENT

Figure 1:
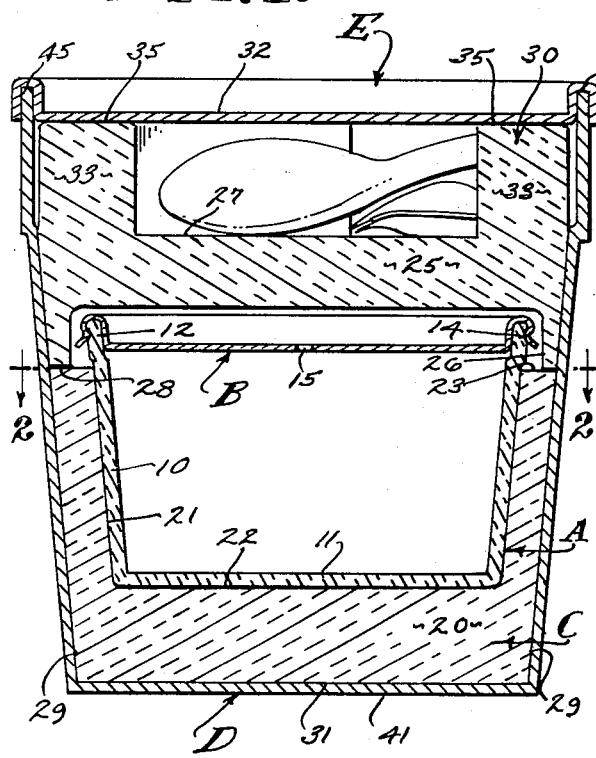
FIG. 1 is a cross sectional elevation of the food transport container with the closed serving cup installed therein.
Figure 2:
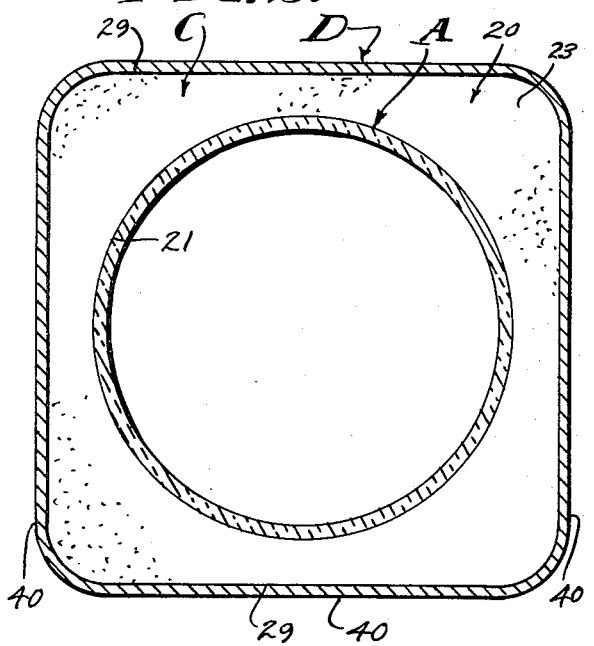
FIG. 2 is a transverse sectional view taken as indicated by line 2—2 on FIG. 1.
Figure 3:
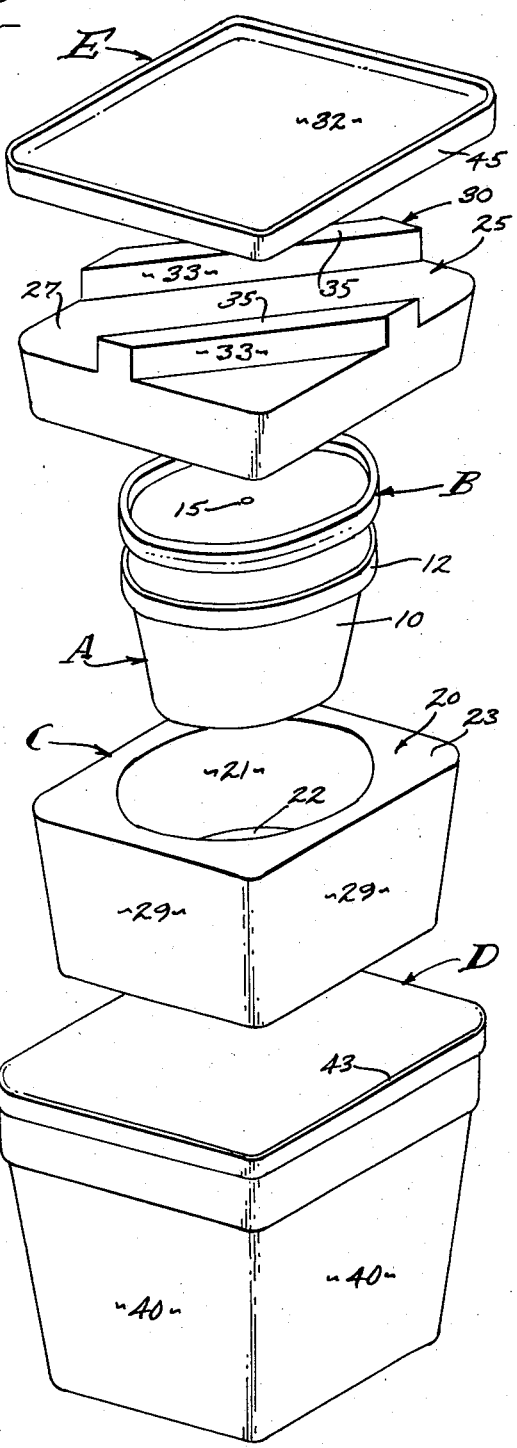
FIG. 3 is an exploded view illustrating the separation of components involved in the container as shown in FIG. 1 and 2.

The serving cup A is an upwardly opened vessel to which the lid B is removeably attached. The cup is essentially a right cylinder disposed on a vertical axis and has an upwardly flared diameter wall 10 and a disc shaped bottom 11 integral therewith. The upper rim 12 is circular and receives the channel-shaped perimeter of the lid B. The said channel is indented with a peripheral rib 14 which constricts onto the outer circumference of the cup A, and so that the lid presses tightly onto the cup. The lid B is disc-shaped and has a small vent opening 15 through which the otherwise closed interior thereof breathes. In practice, the serving cup body is molded of cellular or foamed plastic such as polystyrene having a substantial wall thickness with consequent heat insulating capability; while the lid is vacuum formed of sheet plastic such as polystyrene and which is imperforate except for said vent centrally therethrough.

The sectional liner C positionably surrounds the serving cup A and involves a receptacle 20 and a cover 25 having triple purpose means 30 which provides a handle and a compartment and a positioner as well. The receptacle body 20 has an inner wall 21 and a bottom 22 complementary in form to the corresponding outer walls of the serving cup A, forming for example a round flat bottomed cavity as shown. The serving cup is supported upon bottom 22, and the top 23 of body 20 is in a plane normal to the cup and cavity axis and spaced below the rim 12 so as to occur beneath the perimeter of lid B. Thus, the lid B is manually engageable for lifting the serving cup A into and out of said cavity.

The cover 25 has an inner wall 26 and a top 27 complementary in form to the corresponding outer configurations of the lid B, forming for example a round flat topped cavity as shown. The lid B enters into this cavity to closely approach and/or engage with the top thereof so as to hold the serving cup A and lid B positioned. The bottom 28 of the cover 25 is in a plane normal to the cup and cavity axis and engageable with the aforesaid top 23 of body 20.

The receptacle body 20 and cover 25 are molded of cellular or foamed plastic such as polystyrene having a substantial wall thickness with consequent heat insulating capability, and with an outer wall configuration to receive the enclosing housing D. In accordance with the invention, the housing D is squared in plan configuration in order to provide adequate space for elongated utensils, and accordingly the body 20 and cover 25 are of complementary shape and of squared cross section with flat right angularly related outer walls 29. The body has a bottom wall 31 to rest in the housing D, and the top 32 of cover 25 is flat and engageable with projecting portions of the multipurpose means 30.

The triple purpose means 30 involves a pair of spaced rails 33 that project upwardly from the top surface 27 and extend diagonally thereof so as to form a channel-shaped chamber disposed across corners of the cover. The rails 33 are of substantial height and have coplanar upper surfaces 35 adapted to engage the underside of the cover E. Thus, the means 30 provides for manual engagement of the cover 25, for accommodating utensils and food (packaged) supplements, and for holding the cover 25 downwardly in a secure position.

The housing D and its cover E are molded plastic such as polyethylene having durability adapted to be handled and transported with normal abuse. Also, a hard surfaced plastic which is sanitary and presentable. The housing involves flat right angularly related side walls 40 and a bottom 41. The bottom 41 supportably engages the bottom 31 of the receptacle body while the side walls protectively engage the complementary outer walls of both the receptacle body and its cover. In accordance with the invention, the side walls 40 extend substantially above the plane of the cover top 32 with an open rim 43 to receive a downwardly opening channel 45 in the cover E. The rim 32 and mating channel 45 are circumferentially coextensive and are press fitted so as to secure the cover in a closing position with its imperforate top 32 in a flat plane disposed against the upper surfaces 35 of the means 30. Thus, the assemblage of components is made secure and the interior of the enclosure made hermetically tight.

From the foregoing it will be seen that the components are few and simple in form, that they are made inexpensively so as to be economically expendible, and that they are replaceable. It is a simple matter to prepare a food and to seal it in the serving cup A by pressing the vented lid B thereon. A receptacle body 20 is placed into the housing D and the closed serving cup lifted into position in the supporting cavity, whereupon the cover 25 is placed thereover so as to confine the conditioned food within a heat barrier incapsulation. The desired utensils and food supplements are then placed within the rails 33, whereupon the cover E is placed into position so as to positively enclose and capture all the components in proper working position. Removal of the serving cup for use is simply a reversal of the foregoing procedure.

Having described only a typical preferred form and application of my invention, I do not wish to be limited or restricted to the specific details herein set forth, but wish to reserve to myself any modifications or variations that may appear to those skilled in the art.

I claim:

1. A conditioned food transport container including; a serving cup with a removeably attached lid, a separably sectional liner of heat insulating material and with inner walls and a bottom to completely surround and positionably support the serving cup, and a separably sectional housing having an interior coextensively complementary to the exterior of said liner to enclose the same; there being a multipurpose means on the separably sectional liner and comprised of spaced rails projecting therefrom for manual engagement thereof and engaging the housing enclosure, for accommodating objects necessarily associated with the content of the serving cup, and for holding the liner engageably confined in the housing.

2. The food transport container as set forth in claim 1, wherein the housing is squared in plan configuration, and wherein the spaced rails of the multipurpose means are diagonally disposed.

3. The food transport container as set forth in claim 1, wherein the separably sectional housing has a body and a cover and is squared in plan configuration, wherein the separably sectional liner has a receptacle section and a cover section engageable at a plane of joinder below the plane of the serving cup lid, and said lid accommodated within a recess in said cover, and wherein the spaced rails of the multipurpose means are diagonally disposed and engage the cover of the separably sectional housing.

* * * * *